United States Patent [19]

Pfender

[11] Patent Number: 4,625,773

[45] Date of Patent: Dec. 2, 1986

[54] MACHINE FOR FABRICATING A REINFORCING BODY FOR A CONCRETE PIPE

[75] Inventor: Georg Pfender, Kisslegg, Fed. Rep. of Germany

[73] Assignee: MBK Maschinenbau GmbH, Kisslegg, Fed. Rep. of Germany

[21] Appl. No.: 732,213

[22] Filed: May 9, 1985

[30] Foreign Application Priority Data

Jun. 16, 1984 [DE] Fed. Rep. of Germany ....... 3422420

[51] Int. Cl.$^4$ ............................................. B21F 31/00
[52] U.S. Cl. ..................................... 140/112; 318/578
[58] Field of Search .............. 140/112; 82/19; 219/56; 318/578

[56] References Cited

U.S. PATENT DOCUMENTS

| | | | |
|---|---|---|---|
| 2,932,227 | 4/1960 | Koch et al. ............................... | 82/19 |
| 3,706,331 | 12/1972 | Pennington ......................... | 140/112 |
| 3,718,797 | 2/1973 | Pfender ................................. | 219/56 |
| 4,365,657 | 12/1982 | Pfender . | |
| 4,367,776 | 1/1983 | Pfender ............................. | 140/112 |
| 4,412,295 | 10/1983 | Imazeki et al. ..................... | 318/578 |

FOREIGN PATENT DOCUMENTS

| | | |
|---|---|---|
| 2360532 | 6/1975 | Fed. Rep. of Germany . |
| 2720970 | 11/1978 | Fed. Rep. of Germany . |
| 894798 | 4/1962 | United Kingdom . |

OTHER PUBLICATIONS

The MBK Brochure, 1983.

*Primary Examiner*—Lowell A. Larson
*Attorney, Agent, or Firm*—Spencer & Frank

[57] ABSTRACT

A machine for manufacturing a reinforcing body for a concrete part, the reinforcing body including longitudinal rods and wires wound over and welded to the rods. The machine includes an axially stationary main wheel and an axially mobile support wheel mounted coaxially and drivable synchronously with the main wheel. Adjustable guide pieces are carried by the main wheel for supporting the longitudinal rods to be welded. A first servomechanism is connected to the guide pieces for producing a common uniform adjustment of the guide pieces. A welding carriage is movable transversely to the machine longitudinal direction. A second servomechanism synchronized with the first servomechanism moves the welding carriage in synchronism with the adjustment of the guide pieces and the rods and wire consecutively during rotary movement of the main wheel. A transducer is provided for generating a signal as a function of the rotary angular position which is fed to an amplifier for amplifying the signal by a factor corresponding to the desired size of the reinforcing body. A third servomechanism is connected for receiving the amplified signal and for moving the welding carriage transversely of the machine by an amount dictated by the amplified signal. The second and third servomechanisms are connected in series for moving the welding carriage in accordance with the sum of their movements.

9 Claims, 4 Drawing Figures

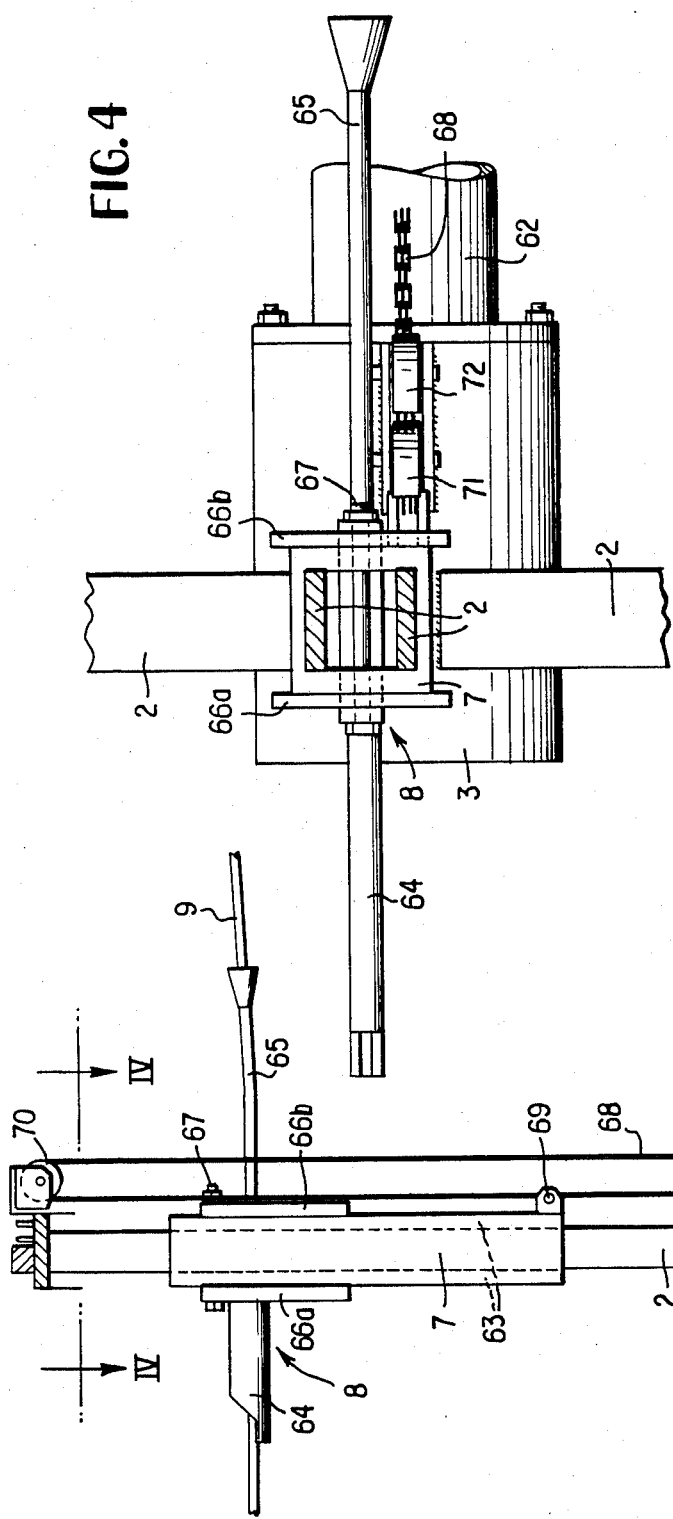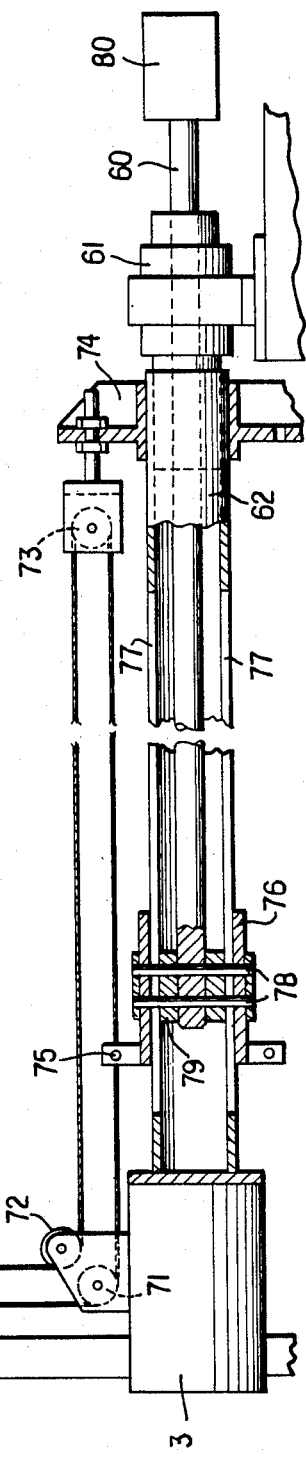

MACHINE FOR FABRICATING A REINFORCING BODY FOR A CONCRETE PIPE

BACKGROUND OF THE INVENTION

The invention relates to a machine for fabricating a reinforcing body for a concrete pipe, wherein the reinforcing body consists of longitudinal rods and of wires wound over the latter and welded thereto at the intersections. Machines are known for this purpose in which a stationary main wheel and an axially mobile support wheel are provided. The wheels are mounted coaxially and are drivable synchronously. The main wheel carries radially adjustable guide pieces which serve as welding supports for the longitudinal rods. A first servomotor is provided for the common uniform adjustment of the guide pieces. A welding carriage is moved transversely to the longitudinal axis of the machine by means of a second servomotor which operates in synchronism with the first servomotor. A welding apparatus, which executes welds at the intersections consecutively during the rotary movement of the main wheel, is mounted on the welding carriage.

Such a machine is disclosed in German Offenlegungsschrift No. 2,946,297 and corresponding U.S. Pat. No. 4,365,657. In this case traction cables, returned in the longitudinal direction by means of pulleys and driven in common by a first cylinder arranged axially behind the main wheel, are provided for the radial displacement of the guide pieces. The first cylinder, and a second cylinder which moves the welding carriage, are constructed and connected hydraulically as synchronous cylinders.

In the case of this known machine it is possible for the guide pieces and the welding apparatus to be adjusted continuously and in synchronism along the total radial stroke existing in the case of a main wheel of a definite diameter. It is thereby possible to consecutively fabricate circular reinforcing bodies, often referred to as reinforcement cages, of different diameters, without waste of time for converting the machine to a new diameter. It is also possible to shape a socket onto the substantially cylindrical-shaped reinforcing bodies, so that the resulting concrete pipes can be plugged into each other.

SUMMARY OF THE INVENTION

An object of the invention is to improve a machine of the above type so that it is also possible to use the machine to fabricate reinforcing bodies of noncircular cross-section and with different maximum diameters.

The above and other objects are achieved according to the invention by the provision of a machine for manufacturing a reinforcing body for a concrete part, wherein the reinforcing body includes longitudinal rods and wires wound over the rods and welded to the rods at the points of intersection with the rods, and wherein the machine has a longitudinal direction and includes: an axially stationary main wheel, the axial direction of the main wheel being in the longitudinal direction of the machine; an axially mobile support wheel mounted coaxially and drivable synchronously with the main wheel; adjustable guide pieces carried by the main wheel for supporting the longitudinal rods to be welded; first servo means connected to the guide pieces for producing a common uniform adjustment of the guide pieces; a welding carriage movable transversely to the machine longitudinal direction; second servo means synchronized with the first servo means for moving the welding carriage transversely to the machine longitudinal direction in synchronism with the adjustment of the guide pieces; welding means mounted on the welding carriage for welding the intersections of the rods and wire consecutively during the rotary movement of the main wheel; signal transducer means for generating a guide quantity signal as a function of the rotary angular position of the main wheel; amplifier means having an adjustable amplification factor, an input connected to the signal transducer means for receiving the guide quantity signal and an output for producing the guide quantity signal amplified by a factor corresponding to the desired size of the reinforcing body; and third servo means connected for receiving the amplified guide quantity signal and for moving the welding carriage transversely of the machine longitudinal direction by an amount dictated by the amplified guide quantity signal, the second and third servo means being connected in series for moving the welding carriage in accordance with the sum of their movements.

If the signal transducer is switched off so that the guide quantity signal is not produced, the third servomechanism consequently remains at rest and the machine operates to produce a reinforcing body with a circular cross-section. However, with the machine according to the invention, it is also possible to individually displace the guide pieces further radially outwards relative to a specific initial radius, so that they form, for example, an oval configuration. The guide quantity signal delivered by the signal transducer corresponds to the individual displacement dimension of the individual guide pieces; that is to say, the signal transducer continuously reproduces for the relevant geometrical configuration the difference between the radius pointing towards the welding apparatus, and the corresponding radius of the original circular guide piece arrangement (initial radius). In operation, the first and the second servomechanisms remain at rest and the third servomechanism moves the welding carriage so that it follows to the desired degree the guide pieces, whatever radial position the latter occupy. Although reinforcing bodies of oval cross-section are principally considered, it is also possible with such a machine to fabricate square or rectangular reinforcing elements, or such elements with other non-circular cross-sections, and in different sizes.

By utilizing the properties of the known machine, that is to say by actuating the first and second servomechanisms, sockets or cross-sectional constrictions can also be shaped onto the reinforcing bodies. Due to their common drive by the first servomechanism, all the guide pieces execute the same radial movement, and the second servomechanism imparts a corresponding movement to the welding carriage. It is irrelevant in this context what initial position the various guide pieces occupy.

The adjustability of the amplification factor of the amplifier device for the guide quantity signal renders it possible to use the same, for example, ovally programmed signal transducer, to fabricate reinforcing elements of mutually similar but different-size cross-sectional shapes. To convert the machine to produce a reinforcing body of increased cross-sectional dimensions, the guide pieces and the welding carriage are moved to a greater initial radius by means of the first and of the second synchronous servomechanisms; and the amplification factor of the guide quantity signal is also increased. The guide pieces are then further adjusted individually, for which purpose the main wheel is rotated in steps by means of a particular cycle control of the machine drive. The welding carriage which moves further out as a result of the increase in the amplification factor serves as a measure for the individual adjustment. The guide piece located opposite the welding roller in each case is released, moved into abutment with the roller and fastened in this position.

With regard to the structural details, in a preferred embodiment the signal transducer comprises a rotatably mounted a circular template coupled synchronously with the main wheel and with a sensing device with a setting member. In the simplest case the template is in the form of a wheel, for example of an oval wheel, which is mounted to be rotatable about its central axis and is sensed radially, perpendicular to the wheel surface. The setting member in the case of an electronic amplifier device may be a sliding resistance. However, hydraulic and even mechanical amplifier devices employing lever arrangements may also be considered.

In a preferred embodiment the third servomechanism is constructed as a ball screw and ball nut mechanism, driven by means of an electric motor, and used in combination with an electronic amplifier device. Ball screw and ball nut mechanisms have an extraordinarily low frictional resistance. The ball nut, which is guided non-rotatably along the ball screw may be connected firmly, preferably through the intermediary of a distance tube, to the drive output side of the second servomechanism, and the bearing of the ball screw to the welding carriage. Depending upon the cross-sectional shape provided for the reinforcement cage, the necessity may arise to rotate specific guide pieces out of their original radial alignment into an alignment intersecting more steeply the curve line of the cross-sectional shape. For this purpose the guide pieces may include a part which cooperates with the welding apparatus so as to be pivotable or displaceable about an axis oriented in the machine longitudinal direction.

Lastly, in order to permit individual adjustment of the guide pieces to the cross-sectional shape of the reinforcement cage without the attendant necessity of releasing the connection between the relevant guide piece and its drive chain, sliding bars each guided slidably along the spokes of the main wheel and connected to a drive chain are provided, to which the guide pieces are attached in an infinitely adjustable manner.

BRIEF DESCRIPTION OF THE DRAWINGS

FIG. 3 is a side elevational view, on a larger scale, and in partial axial section, of the upper half of the main wheel shown in FIG. 1.

FIG. 4 is a horizontal sectional view along line IV—IV in FIG. 3, with a top plan view of a slide rail and a guide member, on an even larger scale.

DESCRIPTION OF THE PREFERRED EMBODIMENTS

Figure 1:
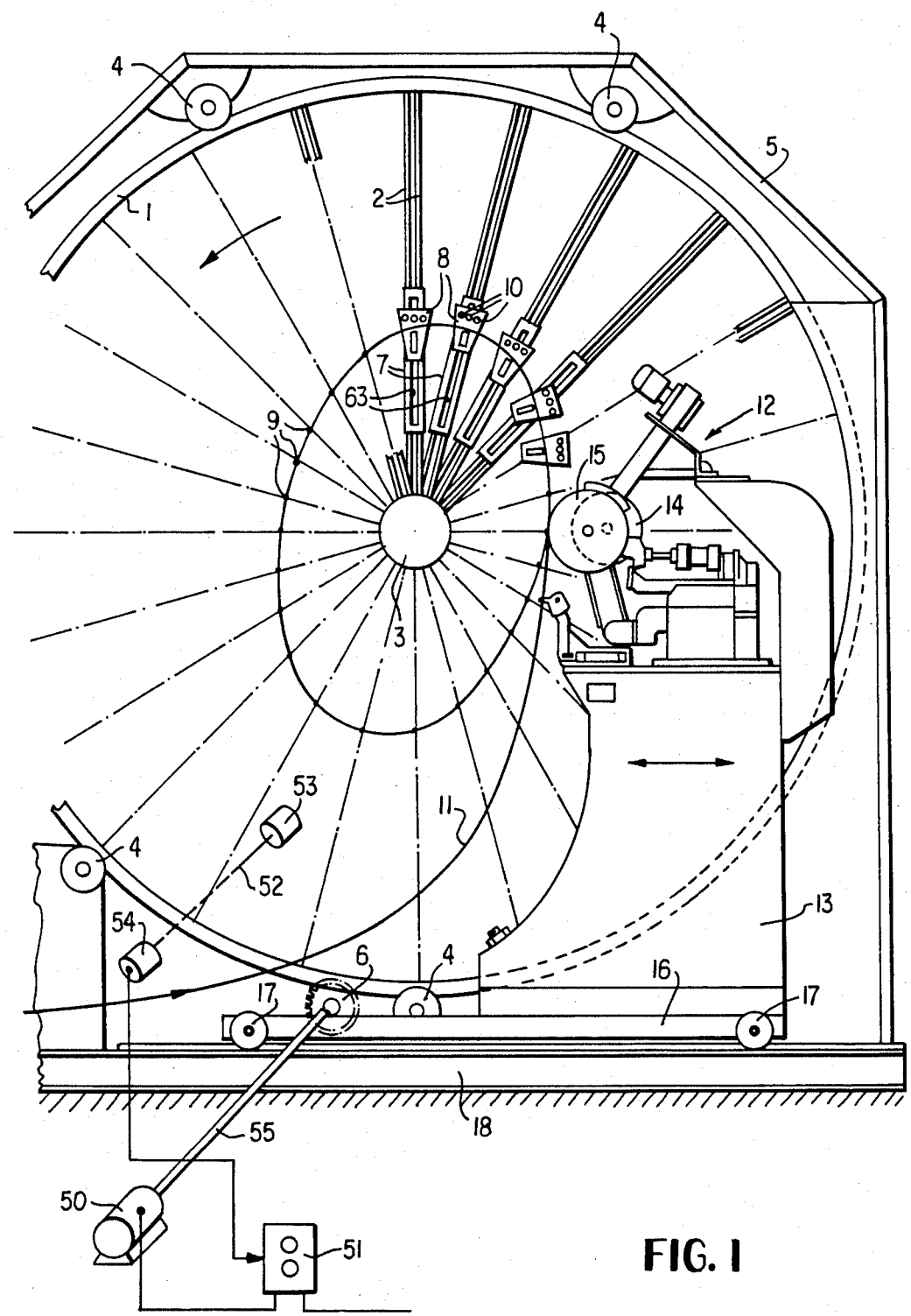
FIG. 1 is an axial elevational view of the main wheel of a reinforcement welding machine according to the invention, viewed from the support wheel.

The fabricating machine according to the invention includes a main wheel which is constructed as a spoked wheel, as is customary for such machines. As shown in FIG. 1, the main wheel has a rim ring 1, a hollow shaft or hub 3 and double spokes 2 connected between ring 1 and hub 3. Five bearing rollers 4 (four of which are shown in FIG. 1) guide rim ring 1 at its circumference. A gantry frame 5 is provided on which two of the upper bearing rollers 4 are mounted. A pinion 6 and a ring gear (not shown) on the rim ring 1 cooperate to drive the main wheel.

Each double spoke 2 is formed of two band-shaped spokes. A sliding bar 7 is slidably guided between the two band-shaped spokes on each double spoke 2. A guide piece 8 is attached in a suitable manner to each sliding bar 7 so as to be infinitely adjustable in the spoke direction. Guide pieces 8 serve to guide and support the longitudinal wires 9 of the reinforcement cage. Each guide piece 8 exhibits a plurality of juxtaposed bores 10 through which each guide piece can be attached to a respective one of the sliding bars 7 in a position pivoted through a small angle relative to the longitudinal wires 9. Winding wire 11 is fed from the bottom left in FIG. 1 and wound over the longitudinal wires 9 and welded to the latter at the intersections during the rotation of the main wheel. The radial position of the guide pieces 8 determines the illustrated oval configuration of the longitudinal wires 9.

Pinion 6 is connected, via a shaft 55, with a drive motor 50. As customary, an electrical motor protection switch 51 having two buttons is connected ahead of the drive motor 50 for switching it on and off. A light barrier, comprised of a lamp 53 generating a light beam 52 and a light receiver 54, extends transversely to the dual spokes 2 so that the light beam 52 is interrupted by spokes 2. Light receiver 54 is connected with motor protection switch 51 which is actuated when the light beam 52 is interrupted so that motor 50 stops. When the respective guide piece 8 has been set, the motor is restarted. As soon as the next double spoke comes into the range of the light barrier, the drive stops again and the next guide piece 8 can be set. During normal operation, the light barrier is switched off.

A mechanism for the uniform adjustment of the radius of guide pieces 8 is described in detail in U.S. Pat. No. 4,365,657, and for completeness is described below.

Referring to FIG. 3, a push rod 60 is adjusted in the longitudinal direction by means of a hydraulic drive cylinder 80, which constitutes a first servomechanism herein. Push rod 60 is guided to be coaxially longitudinally displaceable by means of a pedestal bearing 61 in which a hollow shaft 62 of the main wheel is rotatably mounted. Hub 3 of the main wheel is cup-shaped and is fastened to the front end of hollow shaft 62. One of the sliding bars 7 is visible as a sleeve having a rectangular cross section which surrounds the two band-shaped spokes forming one double spoke 2 and which is radially displaceable along these spokes. Each sliding bar 7 is provided with a slit 63 at its front and rear sides. The associated guide piece 8 is subdivided into a welding support 64 and a tube 65 having a funnel for insertion of longitudinal rods 9. A clamping plate 66a is fastened to welding support 64 and another clamping plate 66b to tube 65. The clamping plates are held together by a clamping screw 67 which passes through slits 63.

Referring further to FIG. 4, a chain 68 is shown fastened to the illustrated sliding bar 7 at point 69 and is guided over four rollers. One roller, 70, is mounted at rim ring 1 of the main wheel and two further rollers, 71 and 72, are mounted at hub 3. A fourth guide roller 73 is urged by a screw against a ring 74, in the manner of a chain tensioning device. Ring 74 is fixed to hollow shaft 62. Thus, endless chain 68 forms an angled double strand having one arm which extends parallel to double spoke 2 and another arm which is axially parallel. The portion of chain 68 moving over inner roller 71 is fastened at point 75 to an annular sleeve 76 which encloses hollow shaft 62. Hollow shaft 62 is provided with two facing longitudinal slots 77. Two transverse pins 78 pass through these slots so as to connect annular sleeve 76 with a slide block 79 disposed in the interior of hollow shaft 62, with push rod 60 engaging at this slide block 79.

Each sliding bar 7 shown in FIG. 1 is suspended from a respective endless chain which extends along a respective one of the spokes and which is fastened to annular sleeve 76 in the same manner as shown in FIG. 3. Thus, if sleeve 76 moves toward the right in FIG. 3, all sliding bars 7 and guide pieces 8 supported thereby move synchronously radially inwardly and vice versa.

Referring again to FIG. 1, the welding is effected by a conventional resistance welding apparatus 12, which is mounted on a welding carriage 13. A contact roller 14 of the welding apparatus establishes the electrical connection with the relevant guide piece 8, and a welding roller 15 rests upon the longitudinal wire 11. The welding carriage is mounted on a chassis 16 on which are mounted four wheels 17 (see also FIG. 2) for moving the welding apparatus 12 on rails 18 of the machine base frame, which rails are oriented transversely of the machine longitudinal direction.

Figure 2:
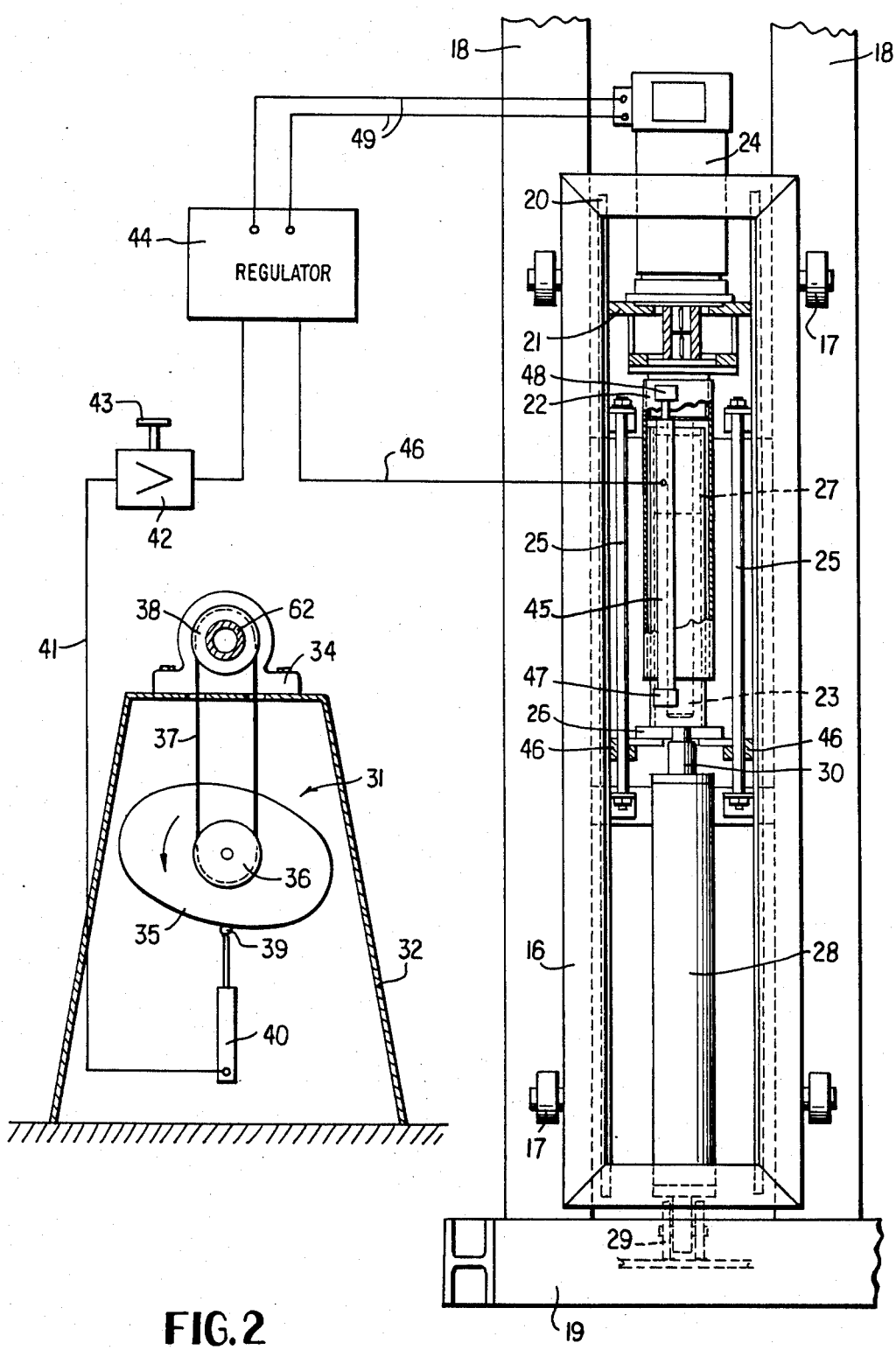
FIG. 2 is a plan elevational view in partial cross-section of the combined adjusting apparatus of the welding carriage according to the invention and a simplified schematic representation of a signal transducer, amplifier and regulator according to the invention.

The drive mechanism of the welding carriage 13 and of its chassis 16 will be described with reference to FIG. 2. The structure in the right-hand half of FIG. 2 shows the two transverse rails 18 and a short longitudinal rail 19, and also the chassis 16 with its wheels 17 which are movable thereon and which are in rolling engagement with rails 18. The chassis 16 also has two parallel longitudinal plates 20 welded on underneath, which are connected by a cross-member 21. A main bearing 22 of a ball screw 23 is attached to cross-member 21. The ball screw 23, which is of known construction, is driven by means of an electric motor 24, which is likewise attached to the cross-member 21 and to the chassis 16. A guide rod 25 extends parallel to the ball screw 23 on each of the two sides thereof. These guide rods 25 are attached to the machine base frame. By means of two sliding bushings 46, a flat disc 26 can be slid along the guide rods 25, but it cannot be rotated. A ball nut 27, cooperating with ball screw 23 in a known manner, is connected firmly to the flat disc 26 by means of a connecting tube 47 surrounding the ball screw 23.

A hydraulic stroke cylinder 28, the second servomechanism herein, is articulated to the longitudinal rail 19 by means of a strap 29. A piston rod 30 of stroke cylinder 28 is screwed into the flat disc 26 and thereby likewise firmly connected to the latter.

An electronic circuit arrangement, which will be described below, serves to control the electric motor 24 which, conjointly with the ball screw 23 and ball nut 27, forms the third servomechanism.

A signal transducer 31, which is illustrated diagrammatically at the bottom left of FIG. 2, is a part of this circuit arrangement. It is located in the bearing block 32 of the main wheel shaft 62. Bearing block 32 is illustrated in section, viewed in the machine longitudinal direction. It is a trapezoidal box, on which the bearing 34 of the main wheel shaft is attached at the top. The signal transducer 31 comprises a sensing wheel 35, the oval shape of which dictates the cross-sectional shape of the reinforcement cages to be fabricated. In the example, sensing wheel 35 is an oval with the width to length ratio of 1 to 1.5 (proportion of minor and major axes). A sprocket wheel 36, which is attached to sensing wheel 35, is driven through the intermediary of a chain 37 by a sprocket wheel 38 of equal size attached to the main wheel shaft 62. The sensing wheel 35 therefore rotates synchronously with the main wheel and support wheel of the machine.

The circumference of the sensing wheel 35 is sensed radially by means of a sensor 39 which moves a conventional sliding resistance 40. The sliding resistance 40 generates a guide quantity signal which is fed through a line 41 to a suitable adjustable gain, proportional amplifier 42. The amplification factor can be modified by an adjusting element 43. The amplified guide quantity signal passes to a first input of a regulator 44 which could comprise, for example, an operational amplifier connected in a closed loop feedback arrangement as described below. The position of the ball screw 23 relative to ball nut 27 is detected by means of a sliding resistance 45, which likewise has the form of a telescopic cylinder and is attached at one end to the connecting tube 47 between ball nut 27 and flat disc 26, and at the other end its telescope rod 48 is attached to the main bearing 22. The electrical quantity delivered by the sliding resistance 45 is fed back via a line 46 to a second, feedback input of regulator 44. Regulator 44 compares the two input quantities and, via lines 49, delivers control signals to the electric motor 24 such that the differences of the input quantities of the logical regulator 44 are nullified as quickly as possible.

Starting from the previously determined adjustment of the guide pieces 8, the described arrangement operates as follows during the fabrication of oval cylindrical reinforcement cages. Initially, the stroke cylinder 28, and therefore also the flat disc 26, remain at rest. The necessary movement of the welding carriage 13 between the minor and the major radius of the oval is effected solely with the third servomechanism comprising regulator 44, ball screw 23, ball nut 27 and motor 24. When the sensor 39 is on the minor radius of the sensing wheel 35 which rotates synchronously with hub 3 of the main wheel, the welding carriage 13 is at its shortest distance from the machine axis. A quarter rotation further on, at which sensor 39 occupies its remotest position from the axis of sensing wheel 35, welding carriage 13 is at its greatest distance from the machine axis. Thus, the shape of the oval of sensing wheel 35, or any other shape of such a wheel, is magnified by the machine to produce a reinforcing body having a cross-section which is proportional to the shape of wheel 35, in the sense of geometrical similarity.

If it is required to attach a socket to the end of the cage, then this is possible with adequate precision for practical purposes in that all the guide pieces 8 are moved radially outwards by, for example, 3 cm by means of the stroke cylinder 80 (FIG. 3) driving the endless chains 68 from which sliding bars 7 are suspended. Stroke cylinder 28 is constructed as a synchronous cylinder and performs a movement corresponding to the movement of stroke cylinder 80 driving the endless chains. That is, stroke cylinders 28 and 80 are hydraulically coupled in such a manner that they move simultaneously, at the same speed and traverse a path of the same length. The movement of stroke cylinder 28 which is imparted to the welding carriage 13 is superimposed upon the movement of the ball screw 23 which generates the oval.

With the above-described machine it is possible to produce oval reinforcement cages of various sizes and radius ratios. The synchronously operated stroke cylinders 28 and 80 define the minor radius and the ball screw drive motor 24 defines the greater radius of the oval. The machine is set as follows, for example, to produce a larger oval. Initially the guide pieces 8, via sliding bars 7, and the welding carriage 13 are moved radially outwardly by the stroke cylinders 80 and 28, respectively, so that the guide pieces 8 assume the desired position on the minor radius of the oval. Then the amplification factor is increased via adjusting element 43 with the result that the ball screw drive motor 24 causes the welding carriage 13 to be moved radially outwardly according to the angular position of the main wheel. Now, individual guide pieces 8 must be set to the larger oval, with welding roller 15 serving as abutment each time. The adjustment is made manually either in that guide pieces 8 are reset at their associated sliding bars 7 or in that sliding bars 7 are released from their chains and advanced along the spokes until the respective guide piece 8 rests against welding roller 15. In this position, sliding bars 7 can then be reconnected with the chains. The foregoing adjustments are facilitated by light barrier 53, 54. If a guide piece has been set, the drive for the main wheel need merely be switched on. If the main wheel has rotated further by one double spoke, the drive will automatically switch itself off as described hereinabove. As soon as all guide pieces 8 have been adjusted, production can begin at once.

Replacement of sensor disc 35 by a disc of different shape permits the production of reinforcement cages having practically any desired crossectional configuration.

It should be mentioned that the machine described exhibits all the characteristics of the known machine initially described, that is to say circular reinforcement cages of any desired diameter can also be fabricated. For this purpose it is only necessary to shift all the guide pieces 8 to the same radius and to restore those guide pieces which were previously pivoted, into their central radial alignment.

It will be understood that the above description of the present invention is susceptible to various modifications, changes and adaptations, and the same are intended to be comprehended within the meaning and range of equivalents of the appended claims.

What is claimed is:

1. A machine for manufacturing a reinforcing body for a concrete part, wherein the reinforcing body includes longitudinal rods and wires wound over the rods and welded to the rods at the points of intersection with the rods, said machine having a longitudinal direction and comprising:

an axially stationary main wheel mounted for rotation, the axial direction of said main wheel being in the longitudinal direction of the machine;
an axially mobile support wheel mounted coaxially and drivable synchronously with said main wheel;
adjustable guide pieces carried by said main wheel for supporting the longitudinal rods to be welded;
first servo means connected to said guide pieces for producing a common uniform adjustment of said guide pieces;
a welding carriage movable transversely to the machine longitudinal direction;
second servo means connected to said welding carriage and synchronized with said first servo means for moving said welding carriage transversely to the machine longitudinal direction in synchronism with the adjustment of said guide pieces;
welding means mounted on said welding carriage for welding the intersections of the rods and wire consecutively during the rotary movement of said main wheel;
signal transducer means for generating a guide quantity signal as a function of the rotary angular position of said main wheel;
amplifier means having an adjustable amplification factor, an input connected to said signal transducer means for receiving said guide quantity signal and an output for producing the guide quantity signal amplified by a factor corresponding to the desired size of the reinforcing body; and
third servo means connected to said welding carriage and having an input for receiving the amplified guide quantity signal, said third servomotor means moving said welding carriage transversely to the machine longitudinal direction by an amount dictated by the amplified guide quantity signal, wherein said second and third servo means are connected in series for moving said welding carriage in accordance with the sum of their movements.

2. Machine according to claim 1, wherein said signal transducer means comprises a rotatably mounted acircular template connected to rotate synchronously with said main wheel, and a sensing means for sensing a radial dimension of said template and for producing a guide quantity signal corresponding to the sensed radial dimension of said template.

3. Machine according to claim 2, wherein said template is an oval wheel, said oval wheel has a central axis perpendicular to a plane defined by the circumference of said oval wheel and said oval wheel is mounted for rotation about said central axis.

4. Machine according to claim 1, wherein said third servo means comprises a ball screw and an electric motor connected for driving said ball screw.

5. Machine according to claim 4, wherein said second servo means has a drive output side, said ball screw has a bearing and said third servo means further includes a ball nut operatively associated with said ball screw, said ball nut being guided non-rotatably with respect to said ball screw and connected firmly to the drive output side of said second servo means, and said bearing being connected to said welding carriage.

6. Machine according to claim 5, wherein said third servo means includes a regulator means having a first input for receiving the amplified guide quantity signal, a second input for receiving a feedback signal corresponding the position of said ball nut relative to said ball screw, and an output connected to said electric motor for feeding said electric motor a signal corresponding to the difference between the amplified guide quantity signal and the feedback signal.

7. Machine according to claim 1, wherein said guide pieces each include a part which cooperates with said welding apparatus and which is pivotable about an axis oriented in the direction of the machine longitudinal axis.

8. Machine according to claim 1, wherein said main wheel includes a plurality of radial spokes and said first servo means includes a plurality of drive chains, and further comprising a plurality of sliding bars, each sliding bar being guided slidably along a respective one of said spokes and being connected to a respective one of said drive chains, said guide pieces each being attached infinitely adjustably to a respective one of said sliding bars.

9. Machine according to claim 1, and further comprising machine drive means connected to said main wheel for rotatably driving said main wheel and cycle control means connected for successively stopping the rotation of said main wheel after onward rotation by one guide piece.

* * * * *